May 3, 1938.  W. MAKENNY  2,116,398
ARTICLE INSPECTION MACHINE
Filed Sept. 23, 1933  7 Sheets-Sheet 3
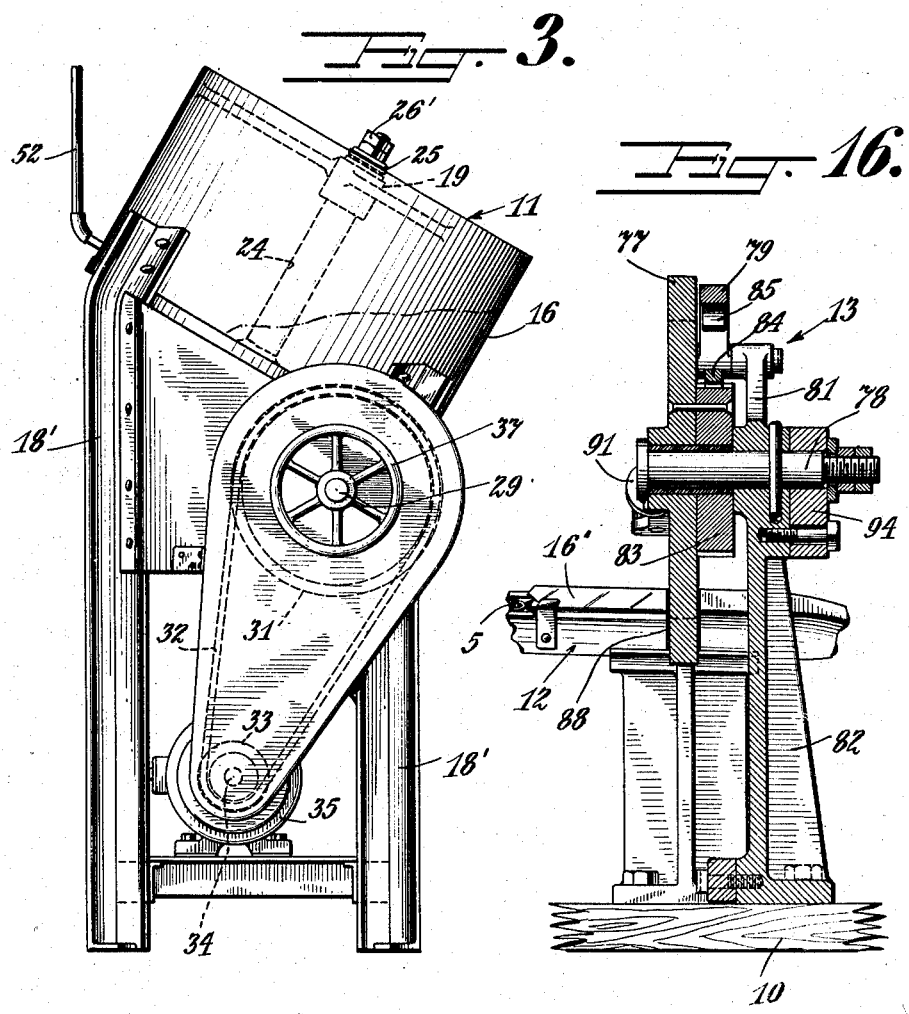
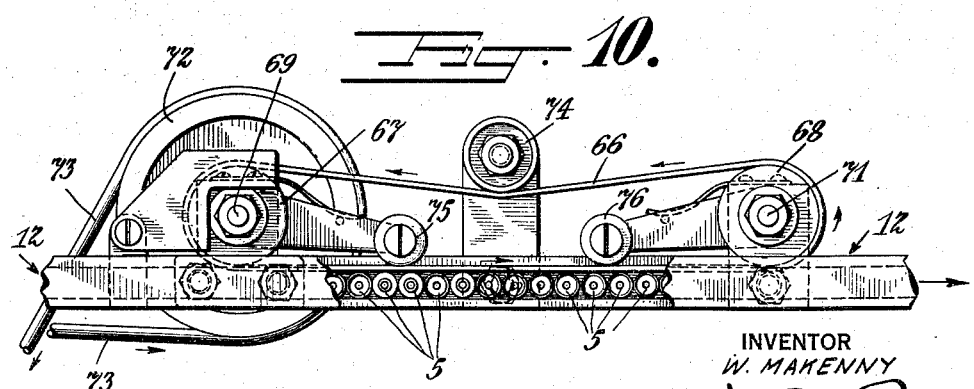
INVENTOR
W. MAKENNY
BY M. F. Reges
ATTORNEY

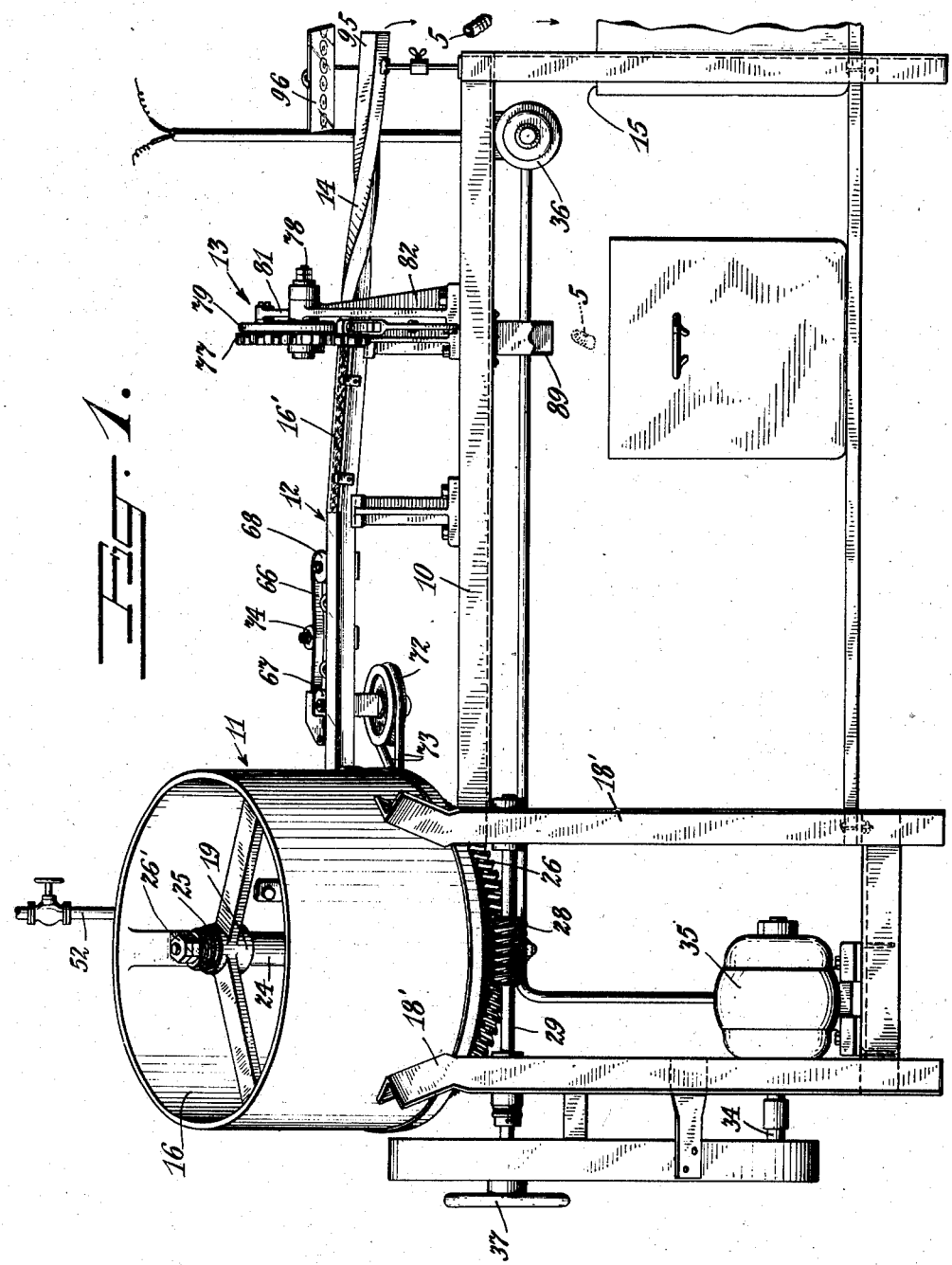

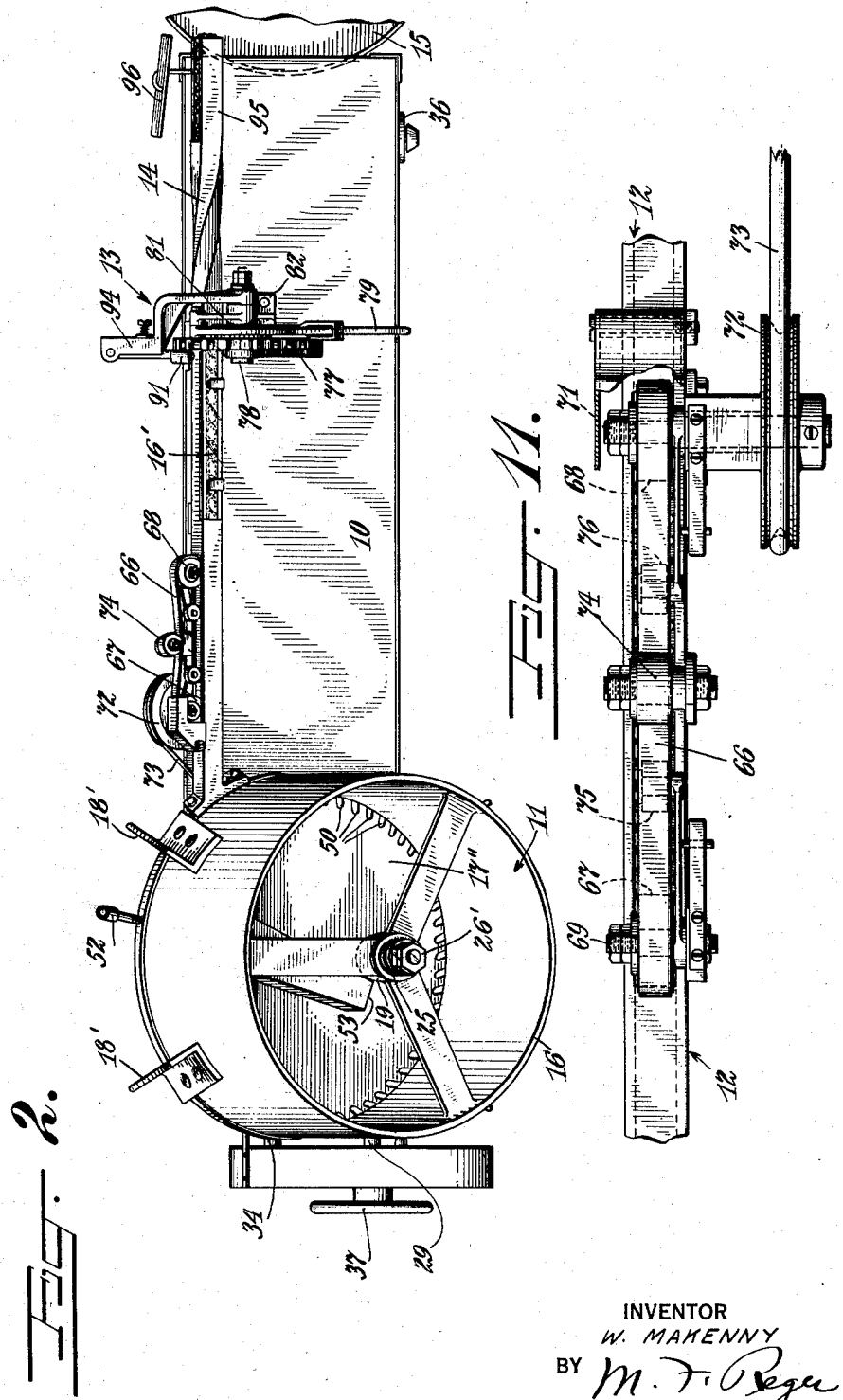

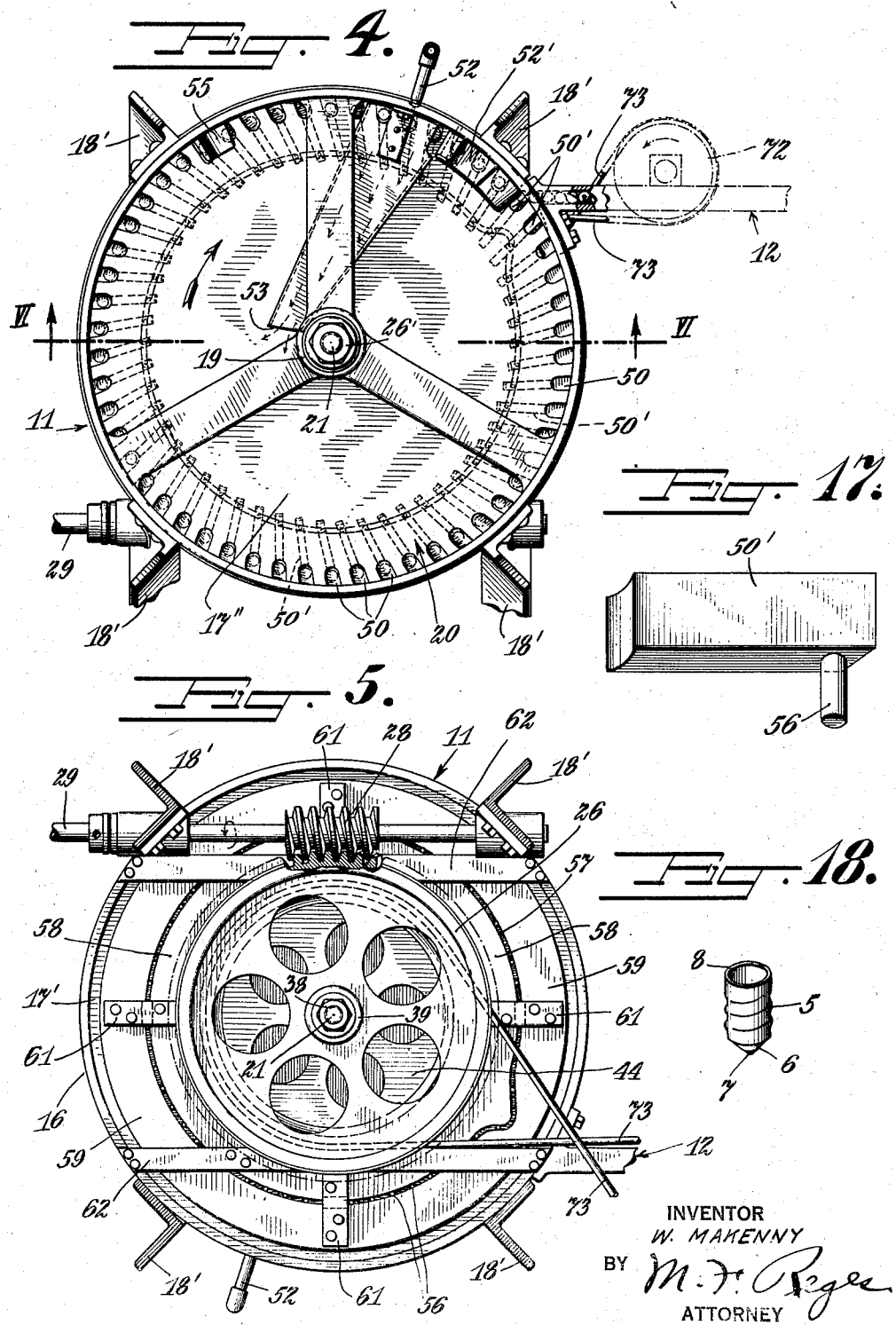

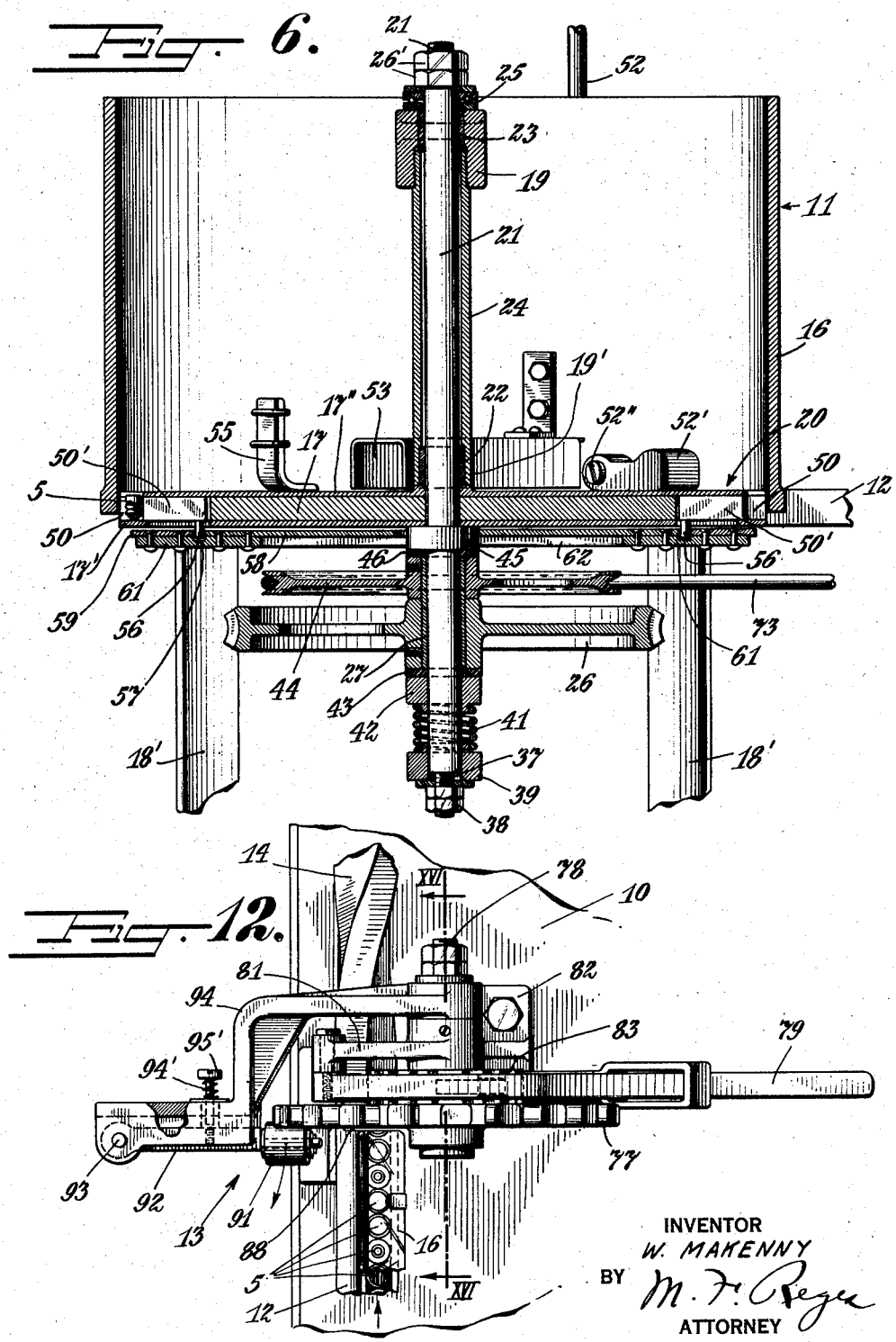

May 3, 1938.  W. MAKENNY  2,116,398
ARTICLE INSPECTION MACHINE
Filed Sept. 23, 1933  7 Sheets-Sheet 6
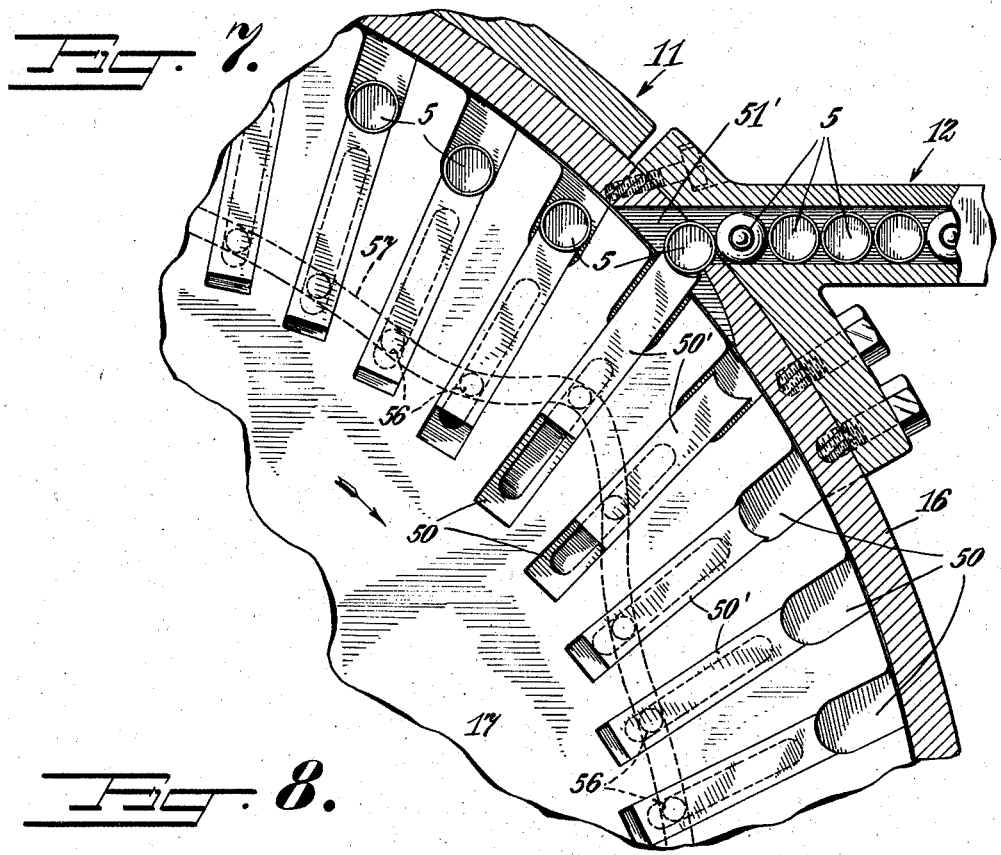
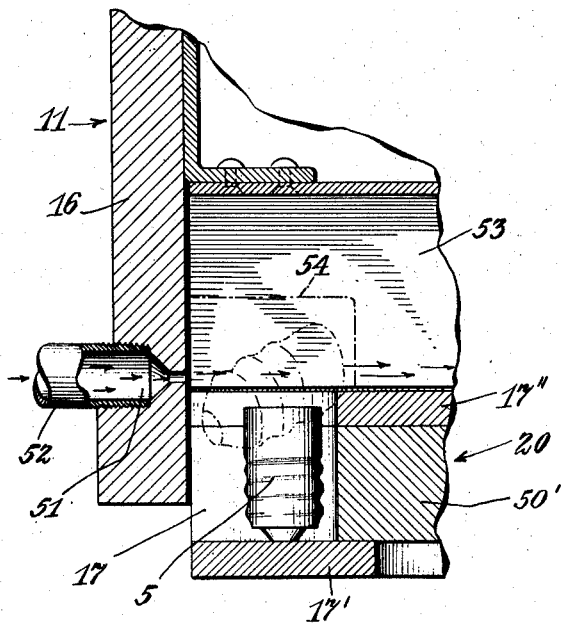
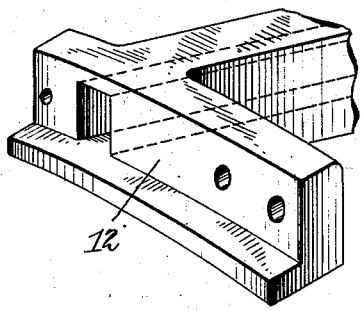
INVENTOR
W. MAKENNY
BY
ATTORNEY

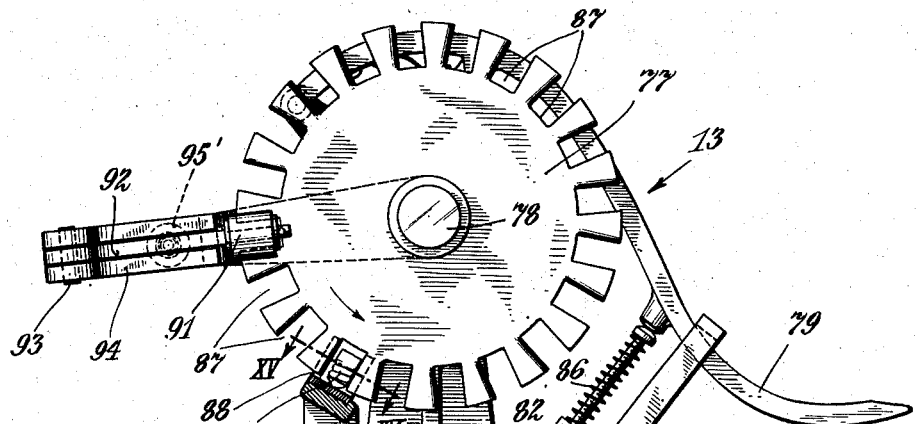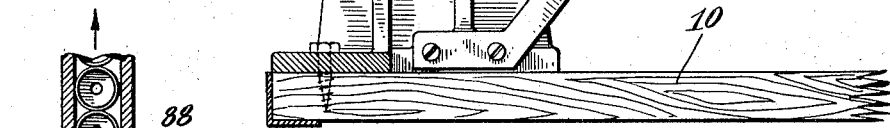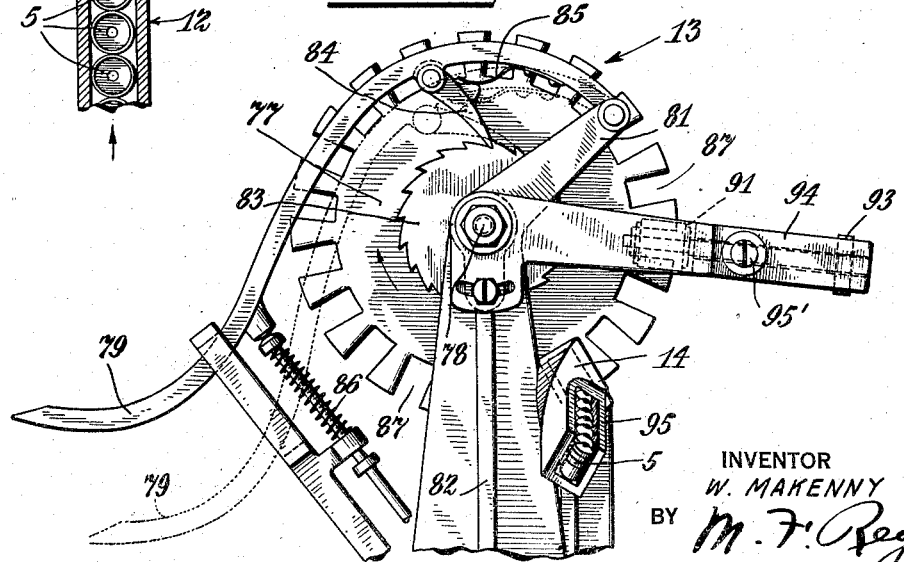

Patented May 3, 1938

2,116,398

UNITED STATES PATENT OFFICE 2,116,398

ARTICLE INSPECTION MACHINE

William Makenny, Mountain View, N. J., assignor, by mesne assignments, to Westinghouse Electric and Manufacturing Company, East Pittsburgh, Pa., a corporation of Pennsylvania Application September 23, 1933, Serial No. 690,755

10 Claims. (Cl. 209—122)

This invention relates to the manufacture of electric incandescent lamps and more particularly to a machine for facilitating the operation of inspecting the bases of such lamps.

An electric incandescent lamp includes a base which consists of a metallic shell which may be of plain cylindrical form or in the form of an externally threaded tube. This shell is provided with a glass web or bottom wall in which a metallic contact is embedded.

Bases are made on automatic machines at a high rate of speed and are transported in bulk to the various machines which attach them to lamp bulbs. By reason of the high rate of production, as well as the handling of these bases it happens that certain defects occur either in the process of manufacture or by reason of their contact with each other. For example, a base may be defective in not having the web in perfect form, but more often it has been found that the wall of a base may be bent or dented, particularly around the edge of the open end. For this reason, therefore, it is necessary to inspect all bases since a defective base would not only slow up the subsequent manufacturing operations but would give an unsatisfactory product.

Since it is necessary to inspect hundreds of thousands of bases, this operation is a serious problem in the lamp art and it is necessary to provide means whereby an inspector may examine the bases while they are passing at relatively high speed so that the inspection operation and removal of defective bases avoids any retardation of the ultimate speed of production.

It is an object of the present invention to provide a simple and convenient machine for passing bases in review before an operator.

Another object of the invention is to provide means for moving bases in view for inspection and means for the convenient and quick ejection of defective bases. Another object of the invention is to provide a mechanism for adjusting and delivering bases through a path for convenient inspection in such manner that an operator may remove a defective base without interrupting the travel of the other bases.

Other objects and advantages will be apparent from the following description together with the accompanying drawings in which Fig. 1 is a side elevational view of a machine embodying the present invention;

Fig. 2 is a top plan view of the machine shown in Fig. 1;

Fig. 3 is an end elevational view looking toward the left side of the machine as shown in Fig. 1;

Fig. 4 is a plan view of the hopper for feeding bases to the machine;

Fig. 5 is a view showing the mechanism beneath the hopper;

Fig. 6 is an enlarged detail view of the hopper shown in vertical cross section;

Fig. 7 is an enlarged fragmentary view showing a portion of the hopper at the point where bases are fed into a guideway;

Fig. 8 is an enlarged detail view showing pneumatic means for removing bases which are not properly adjusted for removal from the hopper;

Fig. 9 is a perspective detail view showing the outlet guide which receives bases delivered from the hopper;

Fig. 10 is a top plan view of mechanism for driving the bases through the guide;

Fig. 11 is a side view of the mechanism shown in Fig. 10;

Fig. 12 is a top view of a base ejecting device shown in its position with relation to a base guideway;

Fig. 13 is a side elevational view of the ejector mechanism shown in Fig. 12;

Fig. 14 is a view showing the operating parts of the ejector mechanism and includes a chute for discharging ejected bases; and Fig. 15 is a fragmentary detail view in cross section showing the relative position of the ejector means and the base guideway;

Fig. 16 is a view taken on line XVI—XVI in Fig. 12;

Fig. 17 is a perspective view of a pusher member; and

Fig. 18 is a perspective view of a miniature base such as the present machine is adapted to handle.

Although the present invention may be employed for the inspection of any small article it is shown and described in connection with the inspection of a base such as shown in Fig. 18. This base includes a metallic shell 5 having external threads and a glass bottom wall 6 in which a contact 7 is embedded. An inspection of a base includes an examination of the shell and particularly the open end to note any deformation of the edge 8, a defect in the glass wall, the absence of a contact, or any other visible defects.

A machine for facilitating the inspection of bases may comprise a table 10 on which are supported a hopper 11 to receive a quantity of bases 5, a guide 12 to receive bases discharged from the hopper, a base ejector device 13 and a base reversing means 14 for changing the positions of the bases before discharge.

The hopper is provided with mechanism for adjusting most of the bases with their open ends up and the bases, by reason of their construction, lend themselves to such adjustment. Some of the bases, however, may be discharged from the hopper with their bottom or closed ends up and the present machine is provided with the above mentioned reversing means so that all the bases will be positioned with their open ends up for inspection.

Before the traveling bases reach the ejector device 13 they may be inspected through a window 16' and such bases as pass the ejector with their open ends down are reversed and inspected just before they are discharged. If a defective base is detected as it travels to the discharge end of the guide the operator catches it before it falls into the receptacle 15.

The above brief description gives a general understanding of the function and purpose of the invention. The mechanism for accomplishing the above will now be described in detail.

The hopper 11 comprises a cylindrical wall 16, a plate 17 of which, in conjunction with a bottom plate 17' and a top plate 17", constitutes a movable platform, (indicated as a whole by the numeral 20). The outer side of the hopper wall 11 is secured to support members 18' and is provided with a bracket 19 having a bearing 19' through which one end of a central shaft 21 extends. The bracket 19 supports the end bearing 19' for the shaft 21 which extends through and is fixed to the movable platform 20 of the hopper. Bushings 22 and 23 are provided as vertical bearing surfaces for the shaft 21 and a sleeve 24 supports the bracket 19. The shaft 21 is freely rotatable by reason of a ball race 25 and is secured from endwise movement by a lock nut 26'.

Mechanism for driving the rotatable bottom plate 20 may comprise a worm wheel 26 secured to a bushing or sleeve 27 on the shaft 21. The worm wheel 26 is disposed in mesh with a worm 28 on a shaft 29 journaled in bearings mounted on support members 18' (see Fig. 1). The shaft 29 is provided with a pulley 31 driven by a belt 32 passing over a pulley 33 on shaft 34 of a motor 35 which latter is controlled by a suitable switch 36. A hand wheel 37 is provided on the shaft 29 for manual operation as when adjustments are to be made in the machine.

The worm wheel 26 is frictionally secured to the shaft 21 so that if a base sticks or the movement of the rotating platform 20 is retarded no destructive force will be applied.

For the purpose of providing a friction drive the shaft 21 is provided with a threaded pin 37 for a lock nut 38 which holds a collar 39 to oppose a spring 41 which presses against a collar 42 separated from one side of the hub of the worm wheel by a friction washer 43. The other side of the worm wheel hub abuts against the hub of a pulley 44, the purpose of which will be presently described. This pulley 44 is secured to the bushing 27 and is separated from a collar 45 on the shaft 21, by a friction washer 46. Thus the worm wheel 26 and the pulley 44 are both arranged to be driven by a frictional or slip engagement with the shaft 21.

The plate 17 of the platform 20 is provided with a plurality of elongated notches 50 disposed in spaced relation about the periphery of the plate (see Fig. 7). Each of these notches or slots is disposed at an angle to the radial lines of the plate and provided with a pusher member 50' operable to eject a base which falls therein. The notches extend through the rotatable platform between the upper and lower plates thereof and the plate 17' serves to support the bases as they are carried around with the platform.

When a quantity of bases are dumped into the hopper they are agitated by the rotary movement of the platform 20 and fall into the notches. When the bases enter the notches they usually fall with the closed end down by reason of the weight of the glass wall or bottom and also by reason of the tapered form of the base at the bottom end which acts to guide that end into a notch. If a base becomes positioned lengthwise across a notch and doe not fall into position it is removed by an air jet nozzle 51 (see Fig. 8) which is supplied with compressed air by means of pipe 52. This nozzle continually blows a jet of air across the tops of the notches and into a passage 53 formed by means of a channel member secured to the hopper wall 16. This passage provides a clear path for bases projected by the air jet so that these bases may move to position for disposition into the other notches. The channel extends over the path of movement of the notches and an opening 54 permits a base disposed crosswise to move in front of the air jet which drives the base through the passage and out among the other bases. A flexible wiper 55 is also provided to engage the upper ends of bases when in the notches to press them into proper vertical positions.

When a base is disposed in a notch and the platform 20 moves to position a base in line with the guide 12, a pusher member 50' is actuated to discharge the base.

For the purpose of holding the bases in their slots during the operation of the pusher members, a presser block 52' is provided under which the bases travel and the weight of the block which is pivoted at 52" to the wall 16, keeps the bases from being dislodged.

The pusher members 50' are provided with depending pins 56 disposed in a stationary cam slot 57 provided by plates 58 and 59. These plates are so formed, arranged and spaced as to provide the slot 57. The plates 58 and 59 are secured together by connectors 61 and to the hopper proper by straps 62. The cam slot 57 is so formed that as a push member 50' reaches the guide 12, it discharges a base into the mouth 51' of the guide. The bases then move into single file along the guide 12 toward the window 16 for inspection. The guide 12 is disposed at an angle to the horizontal to bring the ends of the bases into clear view. The inspector may readily determine which bases are deformed or otherwise defective by glancing into them.

As the bases move along the guide 12 they are engaged by driving means in the form of a traveling belt 66 (see Fig. 10) which frictionally engages the cylindrical walls of the bases and propels them through and along the guide 12 and past the window 16 where they are inspected. The belt 66 which drives the bases, is lead over pulleys 67 and 68 on shafts 69 and 71.

The pulley 67 is driven by means of a pulley 72 receiving rotary motion from a belt 73 which is driven by the pulley 44 which receives its motion from shaft 21. The belt 66 is provided with an idler roller 74 and presser rollers 75 and 76 which cause the belt to bear on the bases to drive them along. As the bases reach the window 16 they are inspected and a relatively large number of bases may be exposed so that the operator will have time to eject a deformed base by means of the ejector device 13.

The ejector device, which is shown in more detail in Figs. 12 to 14 comprises a disk 77 rotatable on a spindle 78. The spindle is intermittently rotatable by means of a hand lever 79 having one end pivotally connected to an arm 81 extending from a bracket 82. A ratchet wheel 83 is attached to the disk 77 and a dog 84, pivotally mounted on the lever 79, serves to engage a tooth of the ratchet wheel making it possible, when depressing the lever, to rotate the disk a given distance. A spring 85 serves to urge the dog against the ratchet wheel and a compression spring 86 operates a plunger which engages the lever to return it to a normal position. The periphery of the disk 77 is provided with radially disposed slots 87 of a width slightly greater than the outside diameter of the bases. The slots 87 are separated by arms which serve as ejector members.

The disk is disposed transverse to the path of movement of the base in the guide 12 and the guide is provided with a slot 88 (see Fig. 15) to permit the travel of the arms defining the notches or slots 87 across the guide and across the path of movement of the bases. The disk is normally held stationary with a slot so positioned the bases pass through and their movement is not interrupted.

If, in the line of bases inspected through the window 16', one appears which is defective, the operator waits until the defective base is in a positioned slot 87 at which time the lever is depressed and the defective base engaged by an arm and ejected into a chute 89. A movement of the lever 79 causes another slot 87 to move in alignment with the guide 12 and may be performed so quickly that the travel of bases is not interrupted.

The disk 77 is held in each intermittent position by means of a check roller 91 carried at the end of an arm 92 pivoted at 93 on an extension support 94. This roller engages each slot 87 and serves to hold the disk against movement until the lever 79 is depressed. For the purpose of holding the roller in tensional engagement with the slots a spring 94' is provided and a pin 95' connected to the arm 92 is provided with a head to engage the spring 94'. The arm is thus moved to hold the roller 91 in firm engagement with a notch but, by reason of the spring, the roller may pass from one notch to another as the lever 79 is operated.

As above mentioned, most of the bases which travel through guide 12 will be positioned with their open ends up. Some of the bases may, however, have their closed ends up making it difficult to inspect the bases along the edges.

The present invention, therefore, includes means for reversing the positions of the bases during their travel.

The reversing means may comprise the spiral guide 14 which is closed during the reversing operation and terminates in a straight portion 95 which exposes the ends of the bases and a mirror 96 is provided so that the operator may more conveniently inspect the bases as they move to the discharge end of the guide.

If a deformed base appears as the bases move along the portion 95 of the guide the operator may catch it as it falls toward the receptacle 15. It will be evident that since the open ended bases are all inspected through the window 16, it is only necessary to give attention to the bases with their open ends up after the reversing operation. Any bases having their bottom ends up while passing the window 16 may then be inspected. The present machine, therefore, makes it possible to conveniently and quickly inspect all the passing bases.

It has been found that with the present machine an operator may easily inspect large numbers of bases and that the inspection may be performed while the bases are moving at relatively high speed. The provision of the window which exposes a long line of bases gives the operator ample time to notice defects and in practice it has been found that the ejector device can be operated with but little effort and in a satisfactory manner.

The present machine makes it possible to inspect bases at a high rate of speed thus reducing the amount of time and labor heretofore necessary with the result that the manufacturing costs are reduced.

Although a preferred embodiment of the invention is shown and described herein it is to be understood that modifications may be made therein without departing from the spirit and scope of the invention as set forth in the appended claims.

What is claimed is:

1. A machine for inspecting work parts comprising power driven means for moving lamp bases while in contacting relation through a given path, means for exposing the bases for inspection, an ejector disk having slots, means for positioning said disk for the movement of said bases through a slot of said disk and means for moving said disk to eject a part.

2. A machine for inspecting work parts comprising power driven means for moving articles while in contacting relation through a given path, means for exposing the articles for inspection, an ejector disk having slots, means for positioning said disk for the movement of said articles through a slot, means for moving said disk to eject an article and means for reversing the positions of said articles after movement through a slot in said disk.

3. A machine for inspecting work parts comprising means for moving parts while in contacting relation through a given continuous path, means for exposing the parts for inspection, a disk movable across the path of movement of said parts said disk having slots for the passage of said parts and means for rotating said disk to eject selected parts during a movement of the parts.

4. A machine for inspecting lamp bases comprising power driven means for moving lamp bases while in contacting relation through a given continuous path, means for exposing the bases for inspection, a disk having slots movable across said path to eject selected defective bases and means for reversing the positions of the remaining bases.

5. A machine of the class described comprising a hopper for articles to be inspected, a guide having a transverse slot, means for feeding articles to said guide, power driven means for moving articles while in contacting relation in single file along said guide, a disk having slots movable across said guide, means for exposing articles for inspection prior to movement past said ejector and means for moving said member through said slot to eject certain of the inspected articles without appreciably interrupting the movement of said articles.

6. A machine of the class described comprising a hopper for articles to be inspected, a guide having a transverse slot, means for feeding articles to said guide, power driven means for moving articles along said guide in single file, an article ejector device having a plurality of members extending therefrom and defining slots therebetween, two of which members normally straddle the line of articles guided and are movable across said transverse slot, means for exposing articles for inspection prior to movement past said ejector, means for operating said device to eject certain of the inspected articles and means for reversing the positions of the remaining articles while maintained in single file.

7. A machine of the class described comprising a hopper for articles to be inspected, a guide for the movement of articles in single file, said guide having a transverse slot, power driven means for moving said articles, means in said hopper for feeding articles in predetermined positions to said guide, means for exposing moving articles for inspection, means rotatable step by step and controllable by an operator for moving articles through said slot in a direction transverse to their movement in said guide and means convenient to an operator inspecting said articles for actuating said last named means to move selected articles from said guide.

8. A machine of the class described comprising a hopper for articles to be inspected, a guide for the movement of articles in single file, said guide having a transverse slot, means in said hopper for feeding articles in predetermined positions to said guide, means for exposing moving articles for inspection, means, provided with notches which are adapted to successively register with said guide, and controllable by an operator while inspecting said articles for moving articles through said slot in a direction transverse to their movement in said guide, means for actuating said last mentioned means to move selected articles, means for reversing the positions of articles not moved by said device and means for maintaining said reversed articles in single file.

9. A machine of the class described comprising a guide for the movement of articles therealong, means for exposing articles for inspection during movement, said guide having a slot for the transverse movement of articles by an operator, means formed with a plurality of elements sequentially movable across said slot to remove selected articles, said elements defining notches adapted to successively register with said guide to allow substantially uninterrupted movement of said articles, and means controllable by said operator for actuating said last mentioned means.

10. A machine of the class described comprising a guide for the movement of articles therealong, means for exposing moving articles for inspection during movement, said guide having a slot for the transverse movement of articles by an operator, a disk having a plurality of arms movable across said slot to remove selected articles, and means controllable by said operator for rotating said disk to cause an arm thereof to engage and eject a selected article.

WILLIAM MAKENNY.